US010840693B2

(12) United States Patent
Gromlovits et al.

(10) Patent No.: US 10,840,693 B2
(45) Date of Patent: Nov. 17, 2020

(54) MODULAR POWER CENTER

(71) Applicant: Electro-Mechanical Corporation, Bristol, VA (US)

(72) Inventors: Mark T. Gromlovits, Bristol, TN (US); Troy K. Mickelsen, Bristol, VA (US); Michael J. Kelly, Bristol, VA (US); Brian G. Barker, Bristol, VA (US); Larry E. Beverly, Bristol, VA (US)

(73) Assignee: Electro-Mechanical Corporation, Bristol, VA (US)

( * ) Notice: Subject to any disclaimer, the term of this patent is extended or adjusted under 35 U.S.C. 154(b) by 308 days.

(21) Appl. No.: 16/054,031

(22) Filed: Aug. 3, 2018

(65) Prior Publication Data

US 2019/0044319 A1    Feb. 7, 2019

Related U.S. Application Data

(60) Provisional application No. 62/541,230, filed on Aug. 4, 2017.

(51) Int. Cl.
*H02H 3/16* (2006.01)
*H02B 5/06* (2006.01)
*H02J 3/36* (2006.01)
*H04L 12/413* (2006.01)
*H02B 1/52* (2006.01)

(52) U.S. Cl.
CPC ............. *H02H 3/16* (2013.01); *H02B 1/52* (2013.01); *H02B 5/06* (2013.01); *H02J 3/36* (2013.01); *H04L 12/413* (2013.01)

(58) Field of Classification Search
None
See application file for complete search history.

(56) References Cited

U.S. PATENT DOCUMENTS

| | | | |
|---|---|---|---|
| 6,002,596 A * | 12/1999 | Mayer | H02M 1/40 363/21.04 |
| 8,606,372 B1 | 12/2013 | Harris et al. | |
| 9,178,349 B2 | 11/2015 | Dong et al. | |
| 9,192,069 B2 | 11/2015 | Emert et al. | |
| 9,343,880 B2 | 5/2016 | Hazel et al. | |
| 9,627,862 B2 | 4/2017 | Hytten et al. | |
| 9,685,782 B2 | 6/2017 | Blackwell et al. | |
| 2005/0068716 A1 | 3/2005 | Pereira | |

(Continued)

FOREIGN PATENT DOCUMENTS

| CN | 105826835 B | 3/2018 |
|---|---|---|
| WO | 1998028829 A1 | 7/1998 |

OTHER PUBLICATIONS

International Search Report; dated Oct. 11, 2018.

*Primary Examiner* — Jeffrey A Gblende
(74) *Attorney, Agent, or Firm* — Luedeka Neely Group, P.C.

(57) ABSTRACT

A modular and adaptable power system may be used to provide electrical power connections in an industrial work site, such as a mine. The system provides a plug-and-play interchangeable output module that can be quickly and easily disconnected from and reconnected to a separate and independent input/feed-through module. This allows a user to daisy chain multiple input/feed-through modules together, thereby greatly reducing setup time. Output modules can be quickly disconnected and relocated and returned to previous locations and reconnected.

18 Claims, 7 Drawing Sheets

(56) References Cited

U.S. PATENT DOCUMENTS

| | | | |
|---|---|---|---|
| 2006/0024996 A1 | 2/2006 | Johnson et al. | |
| 2010/0133901 A1 | 6/2010 | Zhang et al. | |
| 2011/0140523 A1* | 6/2011 | Ziegler | H02J 9/062 |
| | | | 307/44 |
| 2016/0079741 A1* | 3/2016 | Englert | H02B 3/00 |
| | | | 361/624 |
| 2016/0372897 A1* | 12/2016 | Honke | H02B 1/56 |
| 2017/0125984 A1* | 5/2017 | Mergener | B25F 5/00 |

* cited by examiner

*FIG. 6C*
Section A-A

*FIG. 6B*

*FIG. 6D*
View B-B

MODULAR POWER CENTER

CROSS-REFERENCE TO RELATED APPLICATIONS

This application claims priority to U.S. provisional patent application Ser. No. 62/541,230, filed Aug. 4, 2017, titled "Modular Power Center," the entire disclosure of which is hereby incorporated herein by reference.

FIELD

This invention relates to the field of electrical power systems, such as are used in a mining operation.

BACKGROUND OF THE INVENTION

Providing electrical power to industrial equipment at an industrial site that is spread over a large area can be problematic. For example, in a mining operation, a central high-voltage power supply may be located above ground, and power from that supply must be distributed to multiple locations that are underground within the mine. In conventional mining power distribution systems, multiple parallel power cables are run from the above-ground power supply to voltage step-down units distributed at various locations within the mine. Relocating a step-down unit in such a system is troublesome, because the whole unit must be moved and its high-voltage cabling rerouted.

What is needed, therefore, is a modular power system that simplifies the relocation of electrical power distribution nodes within an industrial site, such as for a mine.

SUMMARY OF THE INVENTION

Embodiments of the invention described herein provide a modular and adaptable power system, also referred to herein as a load system, such as may be used to provide electrical power connections in an underground mine. However, the invention is not so limited, and power systems embodying the invention may be used in above ground applications as well.

In overview, preferred embodiments of the power system provide a plug-and-play interchangeable output module that can be quickly and easily disconnected from and reconnected to a separate and independent input/feed-through module. These embodiments allow a user (such as an operator of an underground mine) to daisy chain multiple input/feed-through modules together, thereby greatly reducing setup time. Output modules can be relocated quickly, and brought back to previous locations and reconnected. There is no need for additional vacuum circuit breakers because an input/feed-through module that is left behind at a work site satisfies that need. Thus, the need to purchase conventional power systems for each new mine section is eliminated. Embodiments of the invention allow a user to pre-purchase input/feed-through modules at a much lower cost compared to conventional power systems. Multiple kilovolt (kVa) output modules can be interchanged with one input/feed-through module of the same voltage class.

In a typical installation, a user may employ more input/feed-through modules than output modules. The input/feed-through modules may be relatively permanent, and electrically daisy chained together at intervals along a mining tunnel, such as every 3000 feet. The output modules are relatively portable, and may be relocated easily with conventional onsite transport equipment. The output modules may be mechanically and electrically connected to selected ones (which may be just one) of the input/feed-through modules, and not every one of the input/feed-through modules need have an output module connected to it. Independent input/feed-through modules that are left behind at a work site after a move can be utilized as feed through devices, inline vacuum circuit breakers, or disconnects.

As the term is used herein, a conductor is any structure or material that provides for the flow of electrical current. Power cables and bus bars are nonlimiting examples of conductors.

Embodiments of the invention described herein provide a modular power system for distributing electrical power from a power supply to one or more work sites that are remote from the power supply. In one preferred embodiment, the modular power system includes one or more input/feed-through modules and one or more output modules.

Each input/feed-through module includes a housing having a base portion. An input connector attached to the housing receives a supply voltage, such as 15 kV, from the power supply. A feed-through connector attached to the housing is in electrical communication with the input connector. Generally, when the supply voltage is present at the input connector, the supply voltage is also present at the feed-through connector. In some embodiments, the connection between the input and feed-through connectors may be interrupted, as described hereinafter.

Embodiments of the output module include at least a housing, a power conductor, a first transformer, and a plurality of first electrical receptacles. The housing of the output module has a base portion configured to mechanically align, receive and attach to the base portion of the input/feed-through module housing. The power conductor of the output module is configured to connect to and receive the supply voltage from the input/feed-through module when the modules are joined together. The first transformer is disposed within the second housing and is in electrical communication with the power conductor. The first transformer receives and steps down the supply voltage to a first output voltage. The first electrical receptacles, which are attached to the housing and are in electrical communication with the first transformer, provide the first output voltage to industrial equipment requiring electrical power at the one or more work sites.

In some embodiments, the base portion of the input/feed-through module is configured to align with and slide into connection with the base portion of the output module.

In some embodiments, the base portion of the input/feed-through module is configured to rest on top of the base portion of the output module.

In some embodiments, the base portion of the input/feed-through module and the base portion of the output module are sled-shaped.

In some embodiments, the input/feed-through module includes a vacuum circuit breaker that is electrically connected between the input connector and the feed-through connector. The vacuum circuit breaker selectively opens and closes an electrical connection between the input connector and the feed-through connector.

In some embodiments, the input/feed-through module includes a feed-through control module for controlling operation of the vacuum circuit breaker.

In some embodiments, the input/feed-through module includes a load break switch that is electrically connected between the input connector of the input/feed-through module and the power conductor of the output module. The load break switch selectively opens and closes an electrical connection between the input connector and the power conductor.

In some embodiments, the input/feed-through module includes one or more fuses that are electrically connected between the load break switch and the power conductor, and the power conductor of the output module is removably connected to a terminal block that is connected with the one or more fuses.

In some embodiments, the housing of the input/feed-through module includes a first mating portal, and the housing of the output module includes a second mating portal. When the base portion of the input/feed-through module housing is mechanically attached to the base portion of the output module housing, the first mating portal is in mechanical alignment with the second mating portal. The mechanical alignment of the first and second mating portals forms a passageway between the module housings through which the power passes from the output module housing into the input/feed-through module housing.

In some embodiments, the output module includes a second transformer that is in electrical communication with the first transformer. The second transformer steps down the first output voltage to a second output voltage, such as 480V. These embodiments include a plurality of second electrical receptacles on the output module that are connected to the second transformer to provide the second output voltage to industrial equipment requiring electrical power at the one or more work sites.

In another aspect, the modular power system may provide multiple input/feed-through modules connected in a daisy chain configuration. Embodiments of the system may include first, second, and third power conductors that interconnect the first and second input/feed-through modules and the first and second output modules. The first power conductor has a first end connected to an AC power supply.

The first input/feed-through module includes a first housing, and a first input connector and a first feed-through connector attached to the first housing. The first input connector connects to the second end of the first power conductor for receiving an AC supply voltage from the AC power supply. The first feed-through connector is in electrical communication with the first input connector, so that the AC supply voltage is present at the first feed-through connector when the first input connector is connected to the second end of the first power conductor. The second power conductor has a first end connected to the first feed-through connector to receive the AC supply voltage.

The second input/feed-through module includes a second housing, and a second input connector and a second feed-through connector attached to the second housing. The second input connector connects to the second end of the second power conductor for receiving the AC supply voltage. The second feed-through connector is in electrical communication with the second input connector, so that the AC supply voltage is present at the electrical feed-through connector when the second input connector is connected to the second end of the second power conductor.

The first output module includes a third housing with a first transformer disposed therein. The third power conductor, which is also disposed within the third housing, connects to and receives the AC supply voltage from the second input/feed-through module when the first output module is attached to the second input/feed-through module. The first transformer receives the AC supply voltage from the third power conductor and steps it down to a first AC output voltage. A plurality of first electrical receptacles attached to the third housing are in electrical communication with the first transformer. The first electrical receptacles provide the first AC output voltage to industrial equipment requiring electrical power at a first work site that is remote from the AC power supply.

Some embodiments include a second output module comprising a fourth housing and a second transformer disposed therein. A fourth power conductor, which is also disposed within the fourth housing, connects to and receives the AC supply voltage from the first input/feed-through module when the second output module is attached to the first input/feed-through module. The second transformer receives the AC supply voltage from the fourth power conductor and steps it down to the first AC output voltage. A plurality of second electrical receptacles attached to the fourth housing are in electrical communication with the second transformer. The second electrical receptacles provide the first AC output voltage to industrial equipment requiring electrical power at a second work site that is remote from the first work site.

In some embodiments, the third housing of the first output module includes a base portion extending outward from the third housing. The second housing of the second input/feed-through module includes a base portion that is configured to align with and slide into connection with the base portion of the third housing. In some embodiments, the base portion of the second housing is configured to rest on top of the base portion of the third housing.

In some embodiments, the fourth housing of the second output module includes a base portion extending outward from the fourth housing. The first housing of the first input/feed-through module includes a base portion that is configured to align with and slide into connection with the base portion of the fourth housing. In some embodiments, the base portion of the first housing is configured to rest on top of the base portion of the fourth housing.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
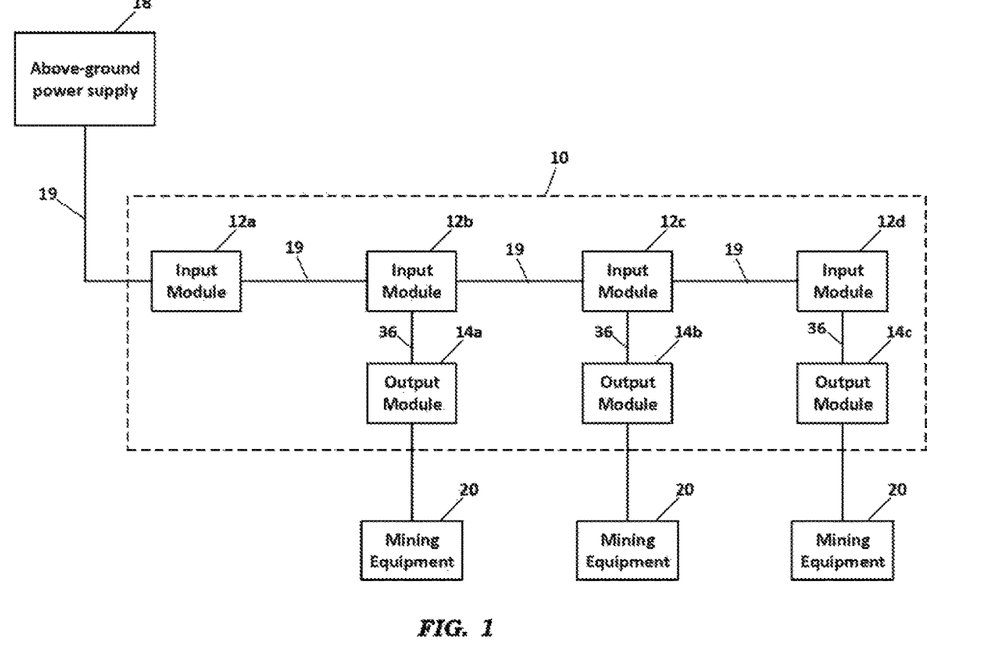
FIG. 1 is a functional block diagram of an exemplary configuration of components of the modular power system in a mining operation.
Figure 2A:
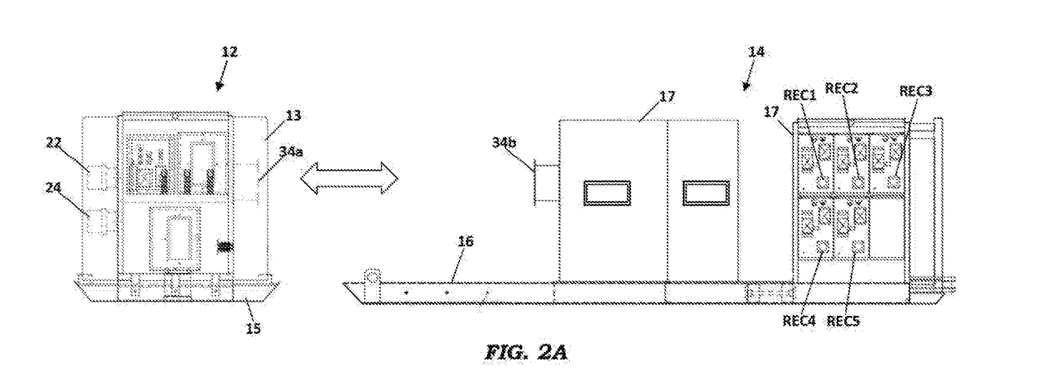
FIG. 2A is a front elevation view of a modular power system in which an input/feed-through module is separated from an output module according to a first embodiment.
Figure 2B:
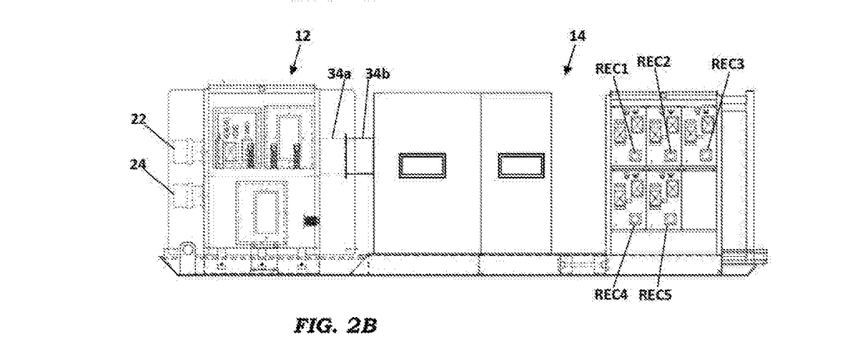
FIG. 2B is a front elevation view of a modular power system in which the input/feed-through module is connected with the output module according to the first embodiment.
Figure 3:
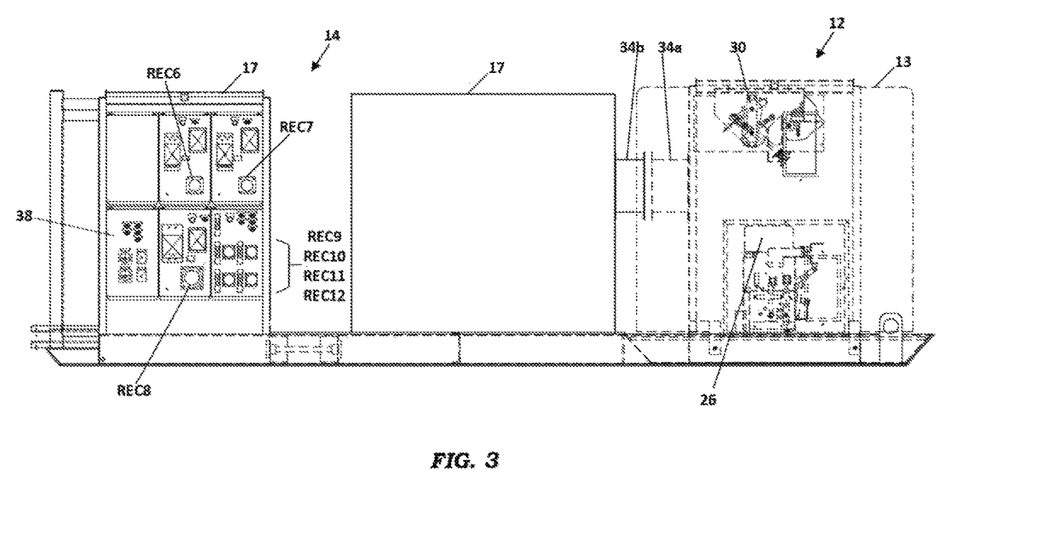
FIG. 3 is a rear elevation view of the power system in which the input/feed-through module is connected with the output module according to the first embodiment.
Figure 4A:
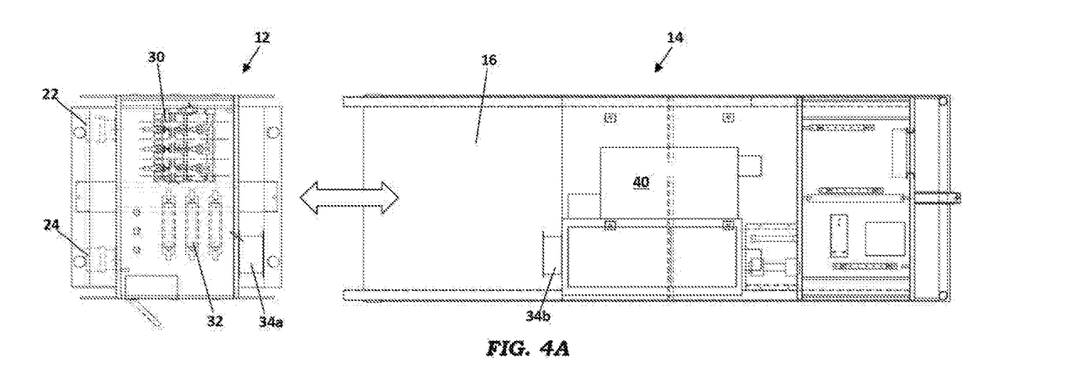
FIG. 4A is a top plan view of the modular power system in which the input/feed-through module is separated from the output module according to the first embodiment.
Figure 4B:
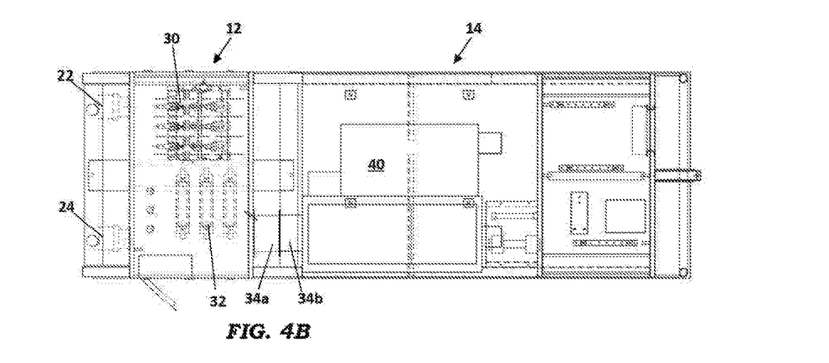
FIG. 4B is a top plan view of the modular power system in which the input/feed-through module is connected with the output module according to the first embodiment.

FIG. 1 depicts an exemplary use of the modular power system 10 in a mining operation. In this example, multiple input/feed-through modules 12a, 12b, 12c, and 12d and output modules 14a, 14b, and 14c are configured to transfer electrical power from an above-ground power supply 18 to below-ground mining equipment 20 located remotely from the supply 18. In this example, the input/feed-through modules 12a and 12b are daisy-chained using power cables 19 in a feed-through configuration, thereby transferring power from the supply 18 to the input/feed-through module 12c. Although the input/feed-through modules 12b and 12c are also configured in a feed-through configuration to transfer power to the input/feed-through module 12d, they further provide power to the output modules 14a and 14b. The input/feed-through module 12d does not provide a feed-through function, but transfers power to the output module 14c. Although four input modules 12a-12d and three output modules 14a-14c are depicted in FIG. 1, those skilled in the art will appreciate that more or fewer input/feed-through modules 12 and output modules 14 could be arranged in many other configurations to transfer power from a power supply to multiple loads.

As shown in FIGS. 2A-2B, 3, and 4A-4B, a preferred embodiment of the modular power system 10 includes at least one input/feed-through module 12 and at least one output module 14. The output module 14 includes one or more housings 17 mounted on a sled-shaped base portion 16. The input/feed-through module 12 includes a housing 13 mounted on a sled-shaped base portion 15 that is preferably configured to align with, slide onto, and attach to the base portion 16 of the output module 14, making it easier for a user to connect the two modules on the job site. The sliding connectivity of the modules 12 and 14 allows a user to employ conventional onsite transport equipment to move the modules 12 and 14 as needed.

In a preferred embodiment, the housing 13 of the input/feed-through module 12 includes a mating portal 34a, and the housing 17 of the output module includes a mating portal 34b. When the input/feed-through module 12 is attached to the output module 14, the mating portal 34a aligns with and attaches to the mating portal 34b, thereby forming a passage between the housing 13 and the housing 17. As discussed in more detail below, a conductor may pass through the passage formed by the mating portals 34a-34b. In one embodiment, the mating portals 34a-34b include mating flanges that are preferably bolted together when the input/feed-through module 12 is attached to the output module 14.

Figure 5:
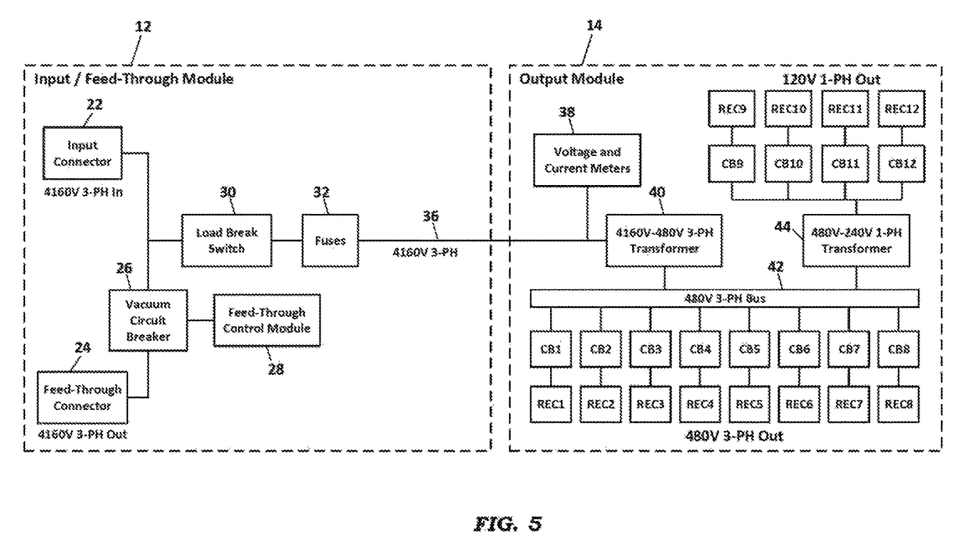
FIG. 5 is a functional block diagram of components of the input/feed-through module and the output module of the modular power system according to a preferred embodiment.
Figure 6A:
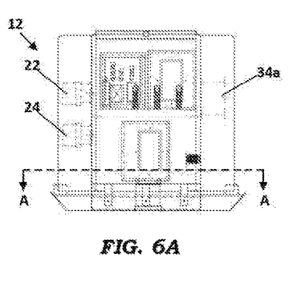
FIG. 6A is front elevation view of the input/feed-through module of the modular power system according to the first embodiment.
Figure 6B:
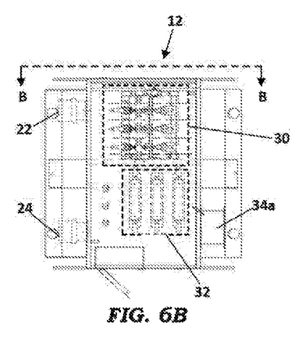
FIG. 6B is a top plan view of the input/feed-through module according to the first embodiment.
Figure 6C:
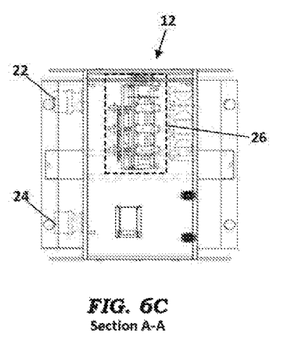
FIG. 6C is a section plan view of the input/feed-through module taken at section A-A depicted in FIG. 6A.
Figure 6D:
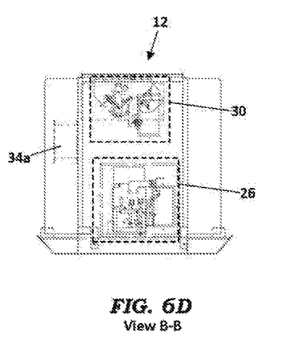
FIG. 6D is a rear elevation view of the input/feed-through module viewed from perspective B-B shown in FIG. 6B.
Figure 6E:
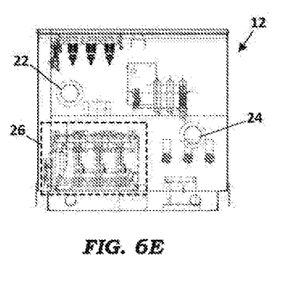
FIG. 6E is a left end elevation view of the input/feed-through module according to the first embodiment.
Figure 6F:
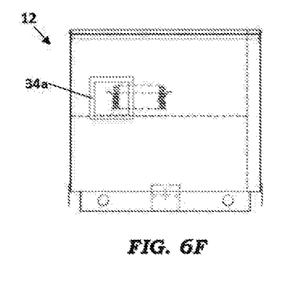
FIG. 6F is a right end elevation view of the input/feed-through module according to the first embodiment.

As shown in the functional block diagram of FIG. 5, a preferred embodiment of the input/feed-through module 12 includes an input connector 22 attached to the housing 13, which may be a standard high voltage coupler, for receiving power, such as from a 3-phase power supply. Power from the input connector 22 is provided to a feed-through connector 24 through a vacuum circuit breaker (VCB) 26. The feed-through connector 24 is also attached to the housing 13 and may also be a standard high voltage coupler. The open/close state of the VCB 26 is controlled by a feed-through control module 28, which in a preferred embodiment, automatically opens the VCB 26 if the current passing through the feed-through circuit exceeds the predetermined setting.

Power from the input connector 22 is also provided to a bank of fuses 32 through a load break switch (LBS) 30. When the input/feed-through module 12 and the output module 14 are connected together, a high-voltage conductor 36 passes through the mating ports 34a-34b and is connected to the fuses 32 through a terminal block. In an alternative embodiment, a pair of mating connectors are provided on the conductor 36 to allow quick connect/disconnect. When the input/feed-through module 12 and the output module 14 are separated, the conductor 36 is disconnected from the terminal block in the input/feed-through module 12 and is stowed within the output module 14.

In a preferred embodiment, once the input/feed-through module 12 and the output module 14 are separated, a cover plate is attached to the mating port 34b to cover the conductor exit opening. When attached to the mating port 34b, the cover plate engages a bypass switch that activates an electrical interlock that is designed to trip the upstream power for personnel protection.

The conductor 36, which is monitored by voltage and current meters 38, is connected to the primary of a step-down transformer 40. In a preferred embodiment, the transformer 40 is a delta/Y configuration rated at 500 KVA that steps the 4160V 3-phase primary voltage to a 480V 3-phase secondary voltage. The 480V secondary voltage is provided to a 3-phase copper bus 42. A preferred embodiment of the output module 14 includes multiple 480V 3-phase power receptacles REC1-REC8 connected to the bus 42 through circuit breakers CB1-CB8. Also connected to the bus 42 is a 480V-240/120V single-phase transformer 44 rated at 10 KVA. The transformer 44 feeds four 120V single-phase power receptacles REC9-REC12 through circuit breakers CB9-CB12. The receptacles REC1-REC12 receive mating connectors on power cables to provide power to the equipment, such as mining equipment.

FIGS. 6A-6F depict various views of a preferred embodiment of the input/feed-through module 12 which indicate the general locations of the various components discussed above.

Figure 7A:
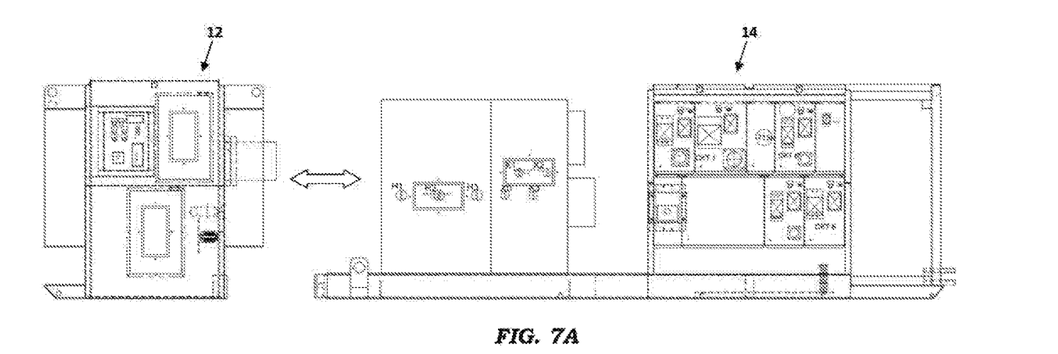
FIG. 7A is a front elevation view of a modular power system in which an input/feed-through module is separated from an output module according to a second embodiment.
Figure 7B:
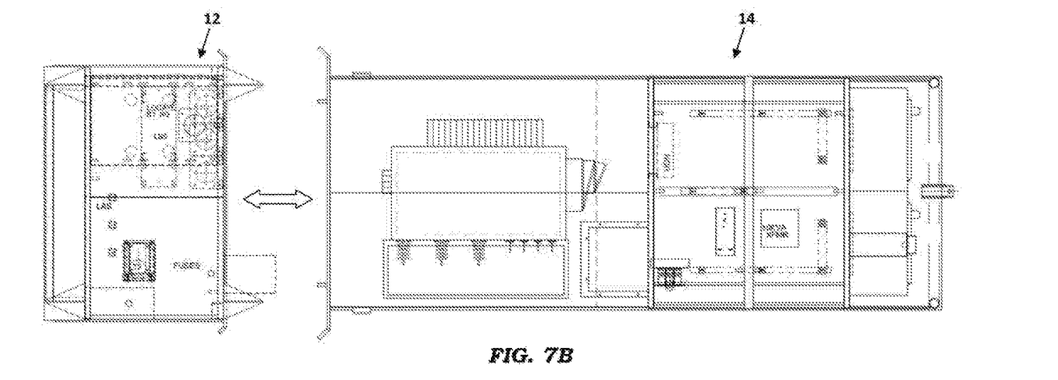
FIG. 7B is a top plan view of the modular power system shown in FIG. 7A.

FIGS. 7A and 7B depict an alternative embodiment in which the base portion of the input/feed-through module 12 is configured to align with and slide into connection with the base portion of the output module 14. In this embodiment, the base portions of the two modules 12 and 14 are configured to abut each other and be bolted together, rather than one base portion resting on top of the other base portion. Otherwise, this embodiment functions in the same manner as the embodiment described above.

The foregoing description of preferred embodiments for this invention have been presented for purposes of illustration and description. They are not intended to be exhaustive or to limit the invention to the precise form disclosed.

Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A modular power system for distributing electrical power from a power supply to one or more work sites that are remote from the power supply, the modular power system comprising:
    an input/feed-through module comprising:
        a first housing having a base portion;
        an input connector attached to the first housing, the input connector for receiving a supply voltage from the power supply; and
        a feed-through connector attached to the first housing, the feed-through connector in electrical communication with the input connector, such that the supply voltage is present at the feed-through connector when the input connector receives the supply voltage from the power supply; and
    an output module comprising:
        a second housing having a base portion configured to mechanically align with, receive, and attach to the base portion of the first housing;
        a conductor configured to connect to and receive the supply voltage from the input/feed-through module when the output module is attached to the input/feed-through module;
        a first transformer disposed within the second housing and in electrical communication with the conductor, the first transformer for receiving and stepping down the supply voltage to a first output voltage that is less than the supply voltage; and
        a plurality of first electrical receptacles attached to the second housing that are in electrical communication with the first transformer, the plurality of first electrical receptacles for providing the first output voltage to industrial equipment requiring electrical power at the one or more work sites.

2. The modular power system of claim 1 wherein the base portion of the input/feed-through module is configured to align with and slide into connection with the base portion of the output module.

3. The modular power system of claim 1 wherein the base portion of the input/feed-through module is configured to rest on top of the base portion of the output module.

4. The modular power system of claim 1 wherein the base portion of the input/feed-through module is sled-shaped.

5. The modular power system of claim 1 wherein the base portion of the output module is sled-shaped.

6. The modular power system of claim 1 wherein the input/feed-through module includes a vacuum circuit breaker disposed within the first housing and electrically disposed between the input connector and the feed-through connector to selectively open and close an electrical connection between the input connector and the feed-through connector.

7. The modular power system of claim 6 wherein the input/feed-through module includes a feed-through control module disposed within the first housing for controlling operation of the vacuum circuit breaker.

8. The modular power system of claim 1 wherein the input/feed-through module includes a load break switch disposed within the first housing and electrically disposed between the input connector of the input/feed-through module and the conductor of the output module, the load break switch for selectively opening and closing an electrical connection between the input connector and the conductor.

9. The modular power system of claim 8 wherein the input/feed-through module includes one or more fuses disposed within the first housing and electrically disposed between the load break switch and the conductor.

10. The modular power system of claim 9 wherein the conductor of the output module is removably connected to a terminal block disposed within the first housing that is in electrical communication with the one or more fuses.

11. The modular power system of claim 1 wherein
    the first housing of the input/feed-through module includes a first mating portal, and
    the second housing of the output module includes a second mating portal,
    wherein when the base portion of the first housing is mechanically attached to the base portion of the second housing, the first mating portal of the first housing is in mechanical alignment with the second mating portal of the second housing, and
    wherein the mechanical alignment of the first and second mating portals forms a passageway between the first and second housings through which the conductor passes from the second housing into the first housing.

12. The modular power system of claim 1 wherein the output module further comprises:
    a second transformer disposed within the second housing and in electrical communication with the first transformer, the second transformer for receiving and stepping down the first output voltage to a second output voltage that is less than the first voltage output voltage; and
    a plurality of second electrical receptacles attached to the second housing that are in electrical communication with the second transformer, the plurality of second electrical receptacles for providing the second output voltage to industrial equipment requiring electrical power at the one or more work sites.

13. A modular power system for distributing alternating-current (AC) electrical power from an AC power supply to one or more work sites that are remote from the AC power supply, the modular power system comprising:
    a first conductor having first and second ends, the first end connected to the AC power supply to receive an AC supply voltage therefrom;
    a first input/feed-through module comprising:
        a first housing;
        a first input connector attached to the first housing, the first input connector operable to connect to the second end of the first conductor for receiving the AC supply voltage; and
        a first feed-through connector attached to the first housing, the first feed-through connector in electrical communication with the first input connector, such that the AC supply voltage from the AC power supply is present at the first feed-through connector when the first input connector is connected to the second end of the first conductor;

a second conductor having first and second ends, the first end of the second conductor connected to the first feed-through connector to receive the AC supply voltage therefrom;
a second input/feed-through module comprising:
a second housing;
a second input connector attached to the second housing, the second input connector operable to connect to the second end of the second conductor for receiving the AC supply voltage; and
a second feed-through connector attached to the second housing, the second feed-through connector in electrical communication with the second input connector, such that the AC supply voltage is present at the electrical feed-through connector when the second input connector is connected to the second end of the second conductor; and
a first output module comprising:
a third housing;
a third conductor configured to connect to and receive the AC supply voltage from the second input/feed-through module when the first output module is attached to the second input/feed-through module;
a first transformer that is in electrical communication with the third conductor, the first transformer for receiving and stepping down the AC supply voltage to a first AC output voltage that is less than the AC supply voltage; and
a plurality of first electrical receptacles attached to the third housing that are in electrical communication with the first transformer, the plurality of first electrical receptacles for providing the first AC output voltage to industrial equipment requiring electrical power at a first work site that is remote from the AC power supply.

14. The modular power system of claim 13 further comprising:
a second output module comprising:
a fourth housing;
a fourth conductor configured to connect to and receive the AC supply voltage from the first input/feed-through module when the second output module is attached to the first input/feed-through module;
a second transformer disposed within the fourth housing that is in electrical communication with the fourth conductor, the second transformer for receiving and stepping down the AC supply voltage to the first AC output voltage; and
a plurality of second electrical receptacles attached to the fourth housing that are in electrical communication with the second transformer, the plurality of second electrical receptacles for providing the first AC output voltage to industrial equipment requiring electrical power at a second work site that is remote from the first work site.

15. The modular power system of claim 13 wherein
the third housing of the first output module includes a base portion extending outward from the third housing, and
the second housing of the second input/feed-through module includes a base portion that is configured to align with and slide into connection with the base portion of the third housing.

16. The modular power system of claim 15 wherein the base portion of the second housing is configured to rest on top of the base portion of the third housing.

17. The modular power system of claim 14 wherein
the fourth housing of the second output module includes a base portion extending outward from the fourth housing, and
the first housing of the first input/feed-through module includes a base portion that is configured to align with and slide into connection with the base portion of the fourth housing.

18. The modular power system of claim 17 wherein the base portion of the first housing is configured to rest on top of the base portion of the fourth housing.

* * * * *